United States Patent
Furukawa et al.

(10) Patent No.: US 7,903,282 B2
(45) Date of Patent: Mar. 8, 2011

(54) IMAGE PROCESSING INFORMATION ASSOCIATION PROCESSOR, PRINTING SYSTEM, METHOD OF ENABLING LAYOUT DATA OUTPUT, AND PROGRAM

(75) Inventors: Itaru Furukawa, Kyoto (JP); Masayuki Fukase, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 1390 days.

(21) Appl. No.: 10/922,945

(22) Filed: Aug. 23, 2004

(65) Prior Publication Data
US 2005/0057776 A1     Mar. 17, 2005

(30) Foreign Application Priority Data
Sep. 11, 2003  (JP) .................... 2003-319728

(51) Int. Cl.
G06K 1/00 (2006.01)
G06F 15/00 (2006.01)
G06F 3/12 (2006.01)
G06K 15/00 (2006.01)
G06K 9/00 (2006.01)
G06K 9/62 (2006.01)

(52) U.S. Cl. ........ 358/1.9; 358/1.13; 358/1.18; 382/112; 382/224

(58) Field of Classification Search .................. None
See application file for complete search history.

(56) References Cited

U.S. PATENT DOCUMENTS

| | | | |
|---|---|---|---|
| 5,970,216 A * | 10/1999 | Tanio et al. ............ | 358/1.13 |
| 6,257,693 B1 | 7/2001 | Miller et al. | |
| 6,434,272 B1 | 8/2002 | Saarelma | |
| 7,375,852 B1 * | 5/2008 | Samoylenko ............ | 358/1.9 |
| 2003/0067632 A1 * | 4/2003 | Ohta et al. ............. | 358/2.1 |

FOREIGN PATENT DOCUMENTS

| | | |
|---|---|---|
| EP | 0 286 414 | 10/1988 |
| EP | 0 395 032 | 10/1990 |
| EP | 0 665 676 | 8/1995 |
| EP | 1 107 577 | 6/2001 |
| EP | 2003150673 | 5/2003 |
| JP | 07-037087 | 2/1995 |
| JP | 2003-283794 A | 10/2003 |

OTHER PUBLICATIONS

Search Report dated Jun. 27, 2006.

* cited by examiner

*Primary Examiner* — Edward L Coles
*Assistant Examiner* — Vincent Rudolph
(74) *Attorney, Agent, or Firm* — McDermott Will & Emery LLP

(57) ABSTRACT

Image features of a plurality of RGB images arranged for layout are extracted, and the RGB images are classified into image categories determined by the commonality of the image features. Recipe information previously set in accordance with the image features is added to layout data while being associated with RGB images for each image category. This enables an output device to perform an optimization process by reference to the added recipe information, thereby outputting good-quality printed matter excellent in color reproduction and the like if information for the process of optimizing RGB image data is not previously provided during the generation of the layout data.

16 Claims, 12 Drawing Sheets

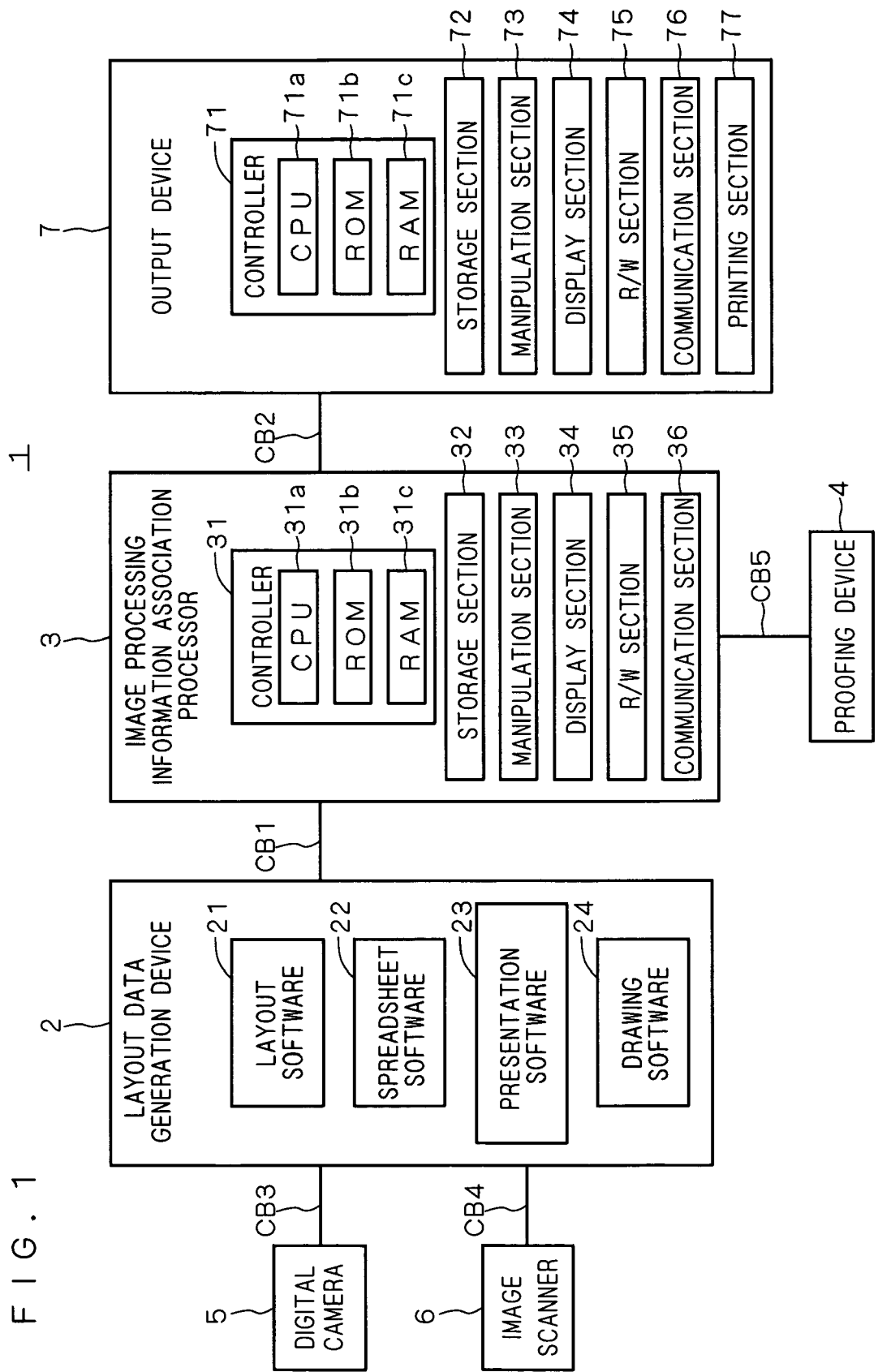
F I G . 1

FIG. 7

TBL2

| | |
|---|---|
| FOOD | REMOVE DULLNESS FROM HUES (RED & GREEN) OF MEAT AND VEGETABLE FOR VIVID FINISH |
| JEWEL | MAKE CORRECTION TO IMPROVE STEREOSCOPIC EFFECT AND BRILLIANCE OF HIGHLIGHT AREA |
| WHITE EARTHENWARE | SET UP HIGHLIGHT POINT TO MAKE WHITE CERAMIC WARE WHITER AND IMPROVE SURFACE SMOOTHNESS |
| STANDARD SKIN | DECREASE COLOR CAST CORRECTION AMOUNT TO PREVENT GRAYISH DULLNESS OF SKIN FOR CLEAR SKIN TONE FINISH |
| LIGHT SKIN | SLIGHTLY DECREASE BRIGHTNESS OF HIGHLIGHT TO PREVENT WHITISH (PALE) SKIN TONE FINISH |
| DARK SKIN | REMOVE COLOR CAST TO MAKE MID-TONE SLIGHTLY BRIGHTER; AND ADJUST SHARPNESS SO AS NOT TO SHOW SKIN ROUGHNESS |
| NIGHT SCENE | IMPART SLIGHTLY BRIGHTER FINISH TO HIGHLIGHT AREA SUCH AS LAMP WHILE MAINTAINING IMAGE DARKNESS |
| MACHINE | SET UP TO SHARPEN EDGES TO PRESENT SHARPNESS OF MACHINE |
| HOME ELECTRIC APPLIANCE | IMPART SMOOTH FINISH TO SURFACE OF WHITE OR PALE HOME ELECTRIC APPLIANCE |

FIG. 8

TBL3

| | |
|---|---|
| SLIGHTLY DARKER | MAKE MID-CONTRAST SLIGHTLY LIGHT |
| SLIGHTLY BRIGHTER | MAKE MID-TONE SLIGHTLY HEAVY |
| SOFTER | DECREASE SHARPNESS CORRECTION AMOUNT |
| HIGHER CONTRAST | ENHANCE CONTRAST |
| WHITER HIGHLIGHT | FINISH HIGHLIGHT MORE BRIGHTLY |
| WASHING OUT ON HIGHLIGHT AREA | REPRODUCE IMAGE SO THAT NO HALFTONE DOTS ARE GENERATED IN AREA BRIGHTER THAN CERTAIN BRIGHTNESS |
| SHARPER (LOW) | INCREASE SHARPNESS CORRECTION AMOUNT |
| SHARPER (HIGH) | INCREASE SHARPNESS CORRECTION AMOUNT |

FIG. 15

| 0 | −1 | 0 |
|---|----|---|
| −1 | 4 | −1 |
| 0 | −1 | 0 |

| −1 | 2 | −1 |
|----|---|----|
| −1 | 2 | −1 |
| −1 | 2 | −1 |

| −1 | −1 | −1 |
|----|----|----|
| 2 | 2 | 2 |
| −1 | −1 | −1 |

| 2 | −1 | 0 |
|---|----|---|
| −1 | 2 | −1 |
| 0 | −1 | 2 |

| 0 | −1 | 2 |
|---|----|---|
| −1 | 2 | −1 |
| 2 | −1 | 0 |

— FT5

IMAGE PROCESSING INFORMATION ASSOCIATION PROCESSOR, PRINTING SYSTEM, METHOD OF ENABLING LAYOUT DATA OUTPUT, AND PROGRAM

BACKGROUND OF THE INVENTION

1. Field of the Invention

The present invention relates to a technique for a conversion process for optimizing RGB image data for printing in a printing system for commercial printing.

2. Description of the Background Art

The proliferation of digital cameras has increased the so-called submission of RGB originals, that is, the transfer (or submission) of layout data for use as an original for printing to a prepress/printing process step, the layout data being created using a photographic image which is an image (RGB image) captured by a digital camera and represented in the RGB color system. RGB image data which provides an RGB image is incorporated (or described) in accordance with a predetermined format in layout data submitted in the form of an RGB original. In the prepress/printing process step, however, it is necessary to perform a color space conversion process for converting the RGB image data into CMYK image data which provides a printable image (CMYK image) represented in the CMYK color system.

Graphic images including graphs created using spreadsheet software or presentation software and so-called CG (computer graphics) images created using drawing software are also created in the form of RGB images. The submission of RGB originals as originals for printing in which such graphic and CG images are arranged in the form of the RGB images for layout has also been on the increase.

The layout data is created, for example, as PDF (Portable Document Format) data. When the layout data is described in the PDF, the color space conversion process is performed on all images arranged for layout by one operation, based on an ICC profile embedded as header information in the layout data.

However, the ICC profile is originally used to maintain color reproduction between input/output devices having different color reproduction characteristics, and the color space conversion process based on the ICC profile is performed uniformly on all image data incorporated in the layout data. Thus, the color space conversion process neither reflects conventional conversion processes (gamut mapping) which have been done by a scanner operator based on his/her empirical rules, nor carries out an sharpness process. On the other hand, it is a common practice that a plurality of images are arranged for layout on printed matter. Individual images different in type (photographic, graphic, or CG images) and in what they express necessitate different processes of image correction to be performed for improvements in expressiveness thereof. To achieve high-quality printed matter, there arises a need to individually perform such image correction processes on a plurality of pieces of image data which provide the individual images in the prepress/printing process step.

To satisfy the need, a printing system (RGB image quality control system) to be described below has been accomplished. In this printing system, recipe data, indicative of the details of the color space conversion process and the image correction process which are image processing to be performed on each RGB image in the prepress/printing process step, is incorporated (or described) during a layout operation in a production/design process step into the layout data described in the PDF and including photographic data providing the RGB images. Then, in the prepress/printing process step, the printing system interprets the details of the recipe data to perform a necessary process, and thereafter performs a rasterizing process or other processes.

If only the image conversion process based on the ICC profile is performed on the layout data received in the form of the RGB original, it is necessary to perform the above-mentioned image correction process on the individual pieces of RGB image data incorporated in the layout data in the prepress/printing process step. However, an output process has become more automated in the recent prepress/printing process, as represented by an intelligence workflow RIP system, and the setting of parameters regarding the output process has become a main operation in the prepress/printing process step. Thus, the above-mentioned correction process is incompatible with the more automated output process.

There is another problem to be described below. Not only the conversion process from the RGB image data to the CMYK image data but also the image correction process to be performed on the original for printing for the purpose of providing high-quality printing has conventionally been performed in a quite different process step than the prepress/printing process step. Therefore, there are not a sufficient number of operators skilled in such processes in the prepress/printing process step.

The use of the above-mentioned RGB image quality control system solves the aforementioned problems in the prepress/printing process step. However, in the RGB image quality control system, equipment for the production/design process step which is a sender of the layout data must have special software capable of creating the recipe data prior to the layout of printed matter. The layout data subjected to such a special process are not always created in the production/design process step.

SUMMARY OF THE INVENTION

The present invention is intended for a technique for a conversion process for optimizing RGB image data for printing in a printing system for commercial printing. According to the present invention, a printing system comprises: a) an image processing information association processor for performing an association process, the association process being the process of associating image processing information necessary for a predetermined output device to perform predetermined image processing with each of one or more pieces of RGB image data contained in layout data, the image processing information association processor including a-1) an image processing information storage element for storing therein a plurality of pieces of image processing information different in detail of processing from each other, a-2) a layout data reading element for reading layout data containing one or more pieces of RGB image data, a-3) an image data extraction element for extracting the one or more pieces of RGB image data from the layout data, a-4) an image feature value calculation element for calculating at least one image feature value for each of the one or more pieces of RGB image data extracted, a-5) an image classification element for making a comparison between the at least one image feature value and a predetermined classification criterion to classify the one or more pieces of RGB image data into a plurality of image categories in accordance with a result of the comparison, the plurality of image categories being previously determined in accordance with the classification criterion, a-6) an association processing element for associating a selected one of the plurality of pieces of image processing information with each of the one or more pieces of RGB image data, and a-7) a combination element for combining the associated one of the plurality of pieces of image processing information with the layout data; and b) an output device including b-1) an image processing element for performing the predetermined image processing on each of the one or more pieces of RGB image data contained in the layout data, based on the associated one of the plurality of pieces of image processing information, the predetermined image processing being the process of converting each of the one or more pieces of RGB image data into a piece of image data capable of being subjected to an output process, and b-2) an output processing element for performing the output process, based on layout data containing the one or more pieces of RGB image data subjected to the predetermined image processing.

This enables the output device to perform the image processing for converting the RGB image data into the image data capable of being subjected to the output process by reference to the image processing information combined with the layout data, thereby outputting good-quality printed matter excellent in color reproduction and the like if information for the process of optimizing the RGB image data is not previously provided during the generation of the layout data.

It is therefore an object of the present invention to provide an image processing information association processor for associating image processing information for optimization of RGB image data for printing with the RGB image data in layout data when the layout data prepared as an original for printing contains the RGB image data, and a printing system including the image processing information association processor.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a construction of a printing system according to a preferred embodiment of the present invention;

FIG. 7 shows a corresponding relationship between image categories and the details of an image correction process to be performed on images belonging to the image categories in the form of a correction detail table by way of illustration;

FIG. 8 shows a fine adjustment menu table including a typical processing menu for setting of a fine adjustment parameter in list form;

FIG. 15 shows a Laplacian filter; and

FIGS. 16A to 16D show calculation process filters.

DESCRIPTION OF THE PREFERRED EMBODIMENTS

<Overall Construction of System>

Figure 2:
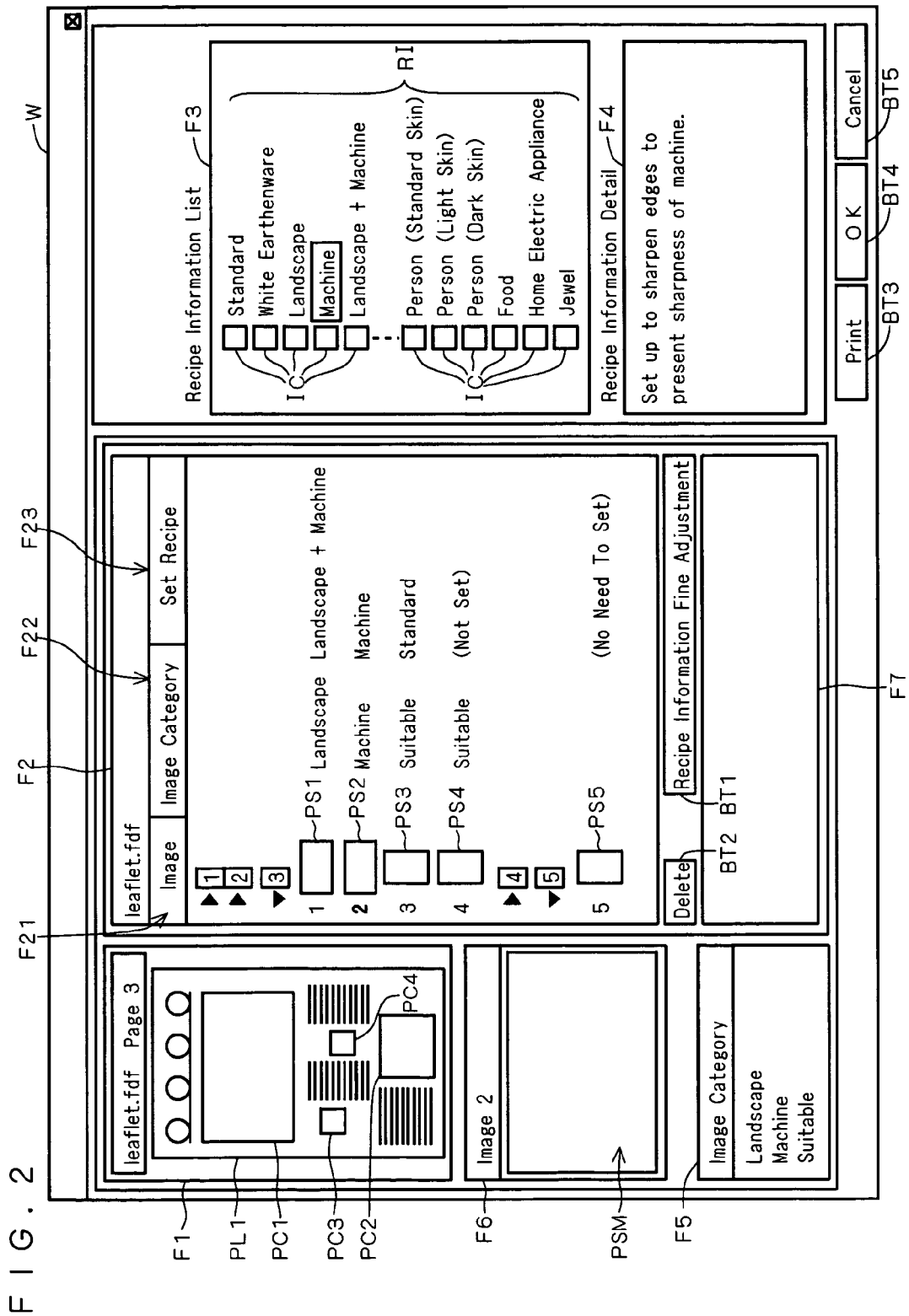
FIG. 2 schematically shows a working window displayed on a display section of an image processing information association processor.

FIG. 1 is a block diagram showing a construction of a printing system 1 according to a preferred embodiment of the present invention. The printing system 1 principally comprises a layout data generation device 2, an image processing information association processor 3, and an output device 7. The layout data generation device 2 is a device for generating layout data DL (FIG. 4) serving as an original (referred to hereinafter as a printing original) of printed matter to be created, by using a photographic image, a graphic image, a CG image, or the like. The image processing information association processor 3 is a device for adding (or incorporating) recipe information (which will be described in detail later) to (or into) the layout data while associating the recipe information with RGB image data, the recipe information being image processing information relating to the process (an optimization process) of optimizing image data included in the layout data for printing. The optimization process used herein refers to a color space conversion process and an image correction process of the layout data including the RGB image data for the purpose of providing high-quality printed matter by printing based on the layout data. The output device 7 interprets the descriptions of the layout data (recipe-equipped layout data) with predetermined recipe information added thereto to perform the optimization process described in the recipe information, and thereafter performs a rasterization process and a final output process. Data transfer between the layout data generation device 2 and the image processing information association processor 3 and between the image processing information association processor 3 and the output device 7 may be carried out either through communication lines CB1 and CB2 by constructing a network of these devices or through a portable recording medium.

The layout data generation device 2 is capable of acquiring photographic data obtained by image capturing using a digital camera 5 to use the photographic data for the layout of the printing original. Alternatively, the layout data generation device 2 may use image data acquired by an input device such as an image scanner 6 to do the layout. The image data transfer from the digital camera 5 and the image scanner 6 to the layout data generation device 2 is carried out either through connection cables CB3 and CB4 such as USB cables or by recording the image data on a portable recording medium (not shown) and reading the recorded image data in the layout data generation device 2.

The layout data generation device 2 is implemented by a general-purpose personal computer. The layout data generation device 2 contains layout software 21, spreadsheet software 22, presentation software 23, drawing software 24 and the like which are installed therein. The layout data generation device 2 uses such software 21 to 24 to create and process an image as appropriate, and then generates the layout data serving as the printing original including the image, that is, the layout data DL with the image data incorporated therein. Commercially available software may be used as the software 21 to 24. Preferably, the layout data DL is described on a page-by-page basis by a page description language (PDL). More preferably, the layout data DL is described in the PDF.

The image processing information association processor 3 is also implemented by a general-purpose personal computer. The image processing information association processor 3 principally comprises: a controller 31 including a CPU 31a, a ROM 31b and a RAM 31c for implementing functions to be described later; a storage section 32 constructed by a hard disk and the like for storing the layout data DL received from the outside of the processor 3, and a predetermined operating program 32p (FIG. 3) for causing the personal computer to implement the image processing information association processor 3; a manipulation section 33 including a mouse and a keyboard for an operator to enter various commands; a display section 34 such as a display device; an R/W section 35 for reading and writing data from and to various portable recording media; and a communication section 36 serving as an interface for transfer of data to and from other devices and the like.

In the image processing information association processor 3, a so-called GUI (Graphical User Interface) capable of processing while displaying the details of manipulation through the manipulation section 33 and the current processing status of various processes on the display section 34 is implemented by the functions of the controller 31, the manipulation section 33 and the display section 34. Processes in respective sections to be described later which are implemented in the controller 31 are also carried out using the GUI. FIG. 2 schematically shows a working window W displayed on the display section 34. The action of the GUI allows a desired process to be performed while the details of a command entered through the manipulation section 33 and the current status of operation are displayed in the working window W.

Figure 3:
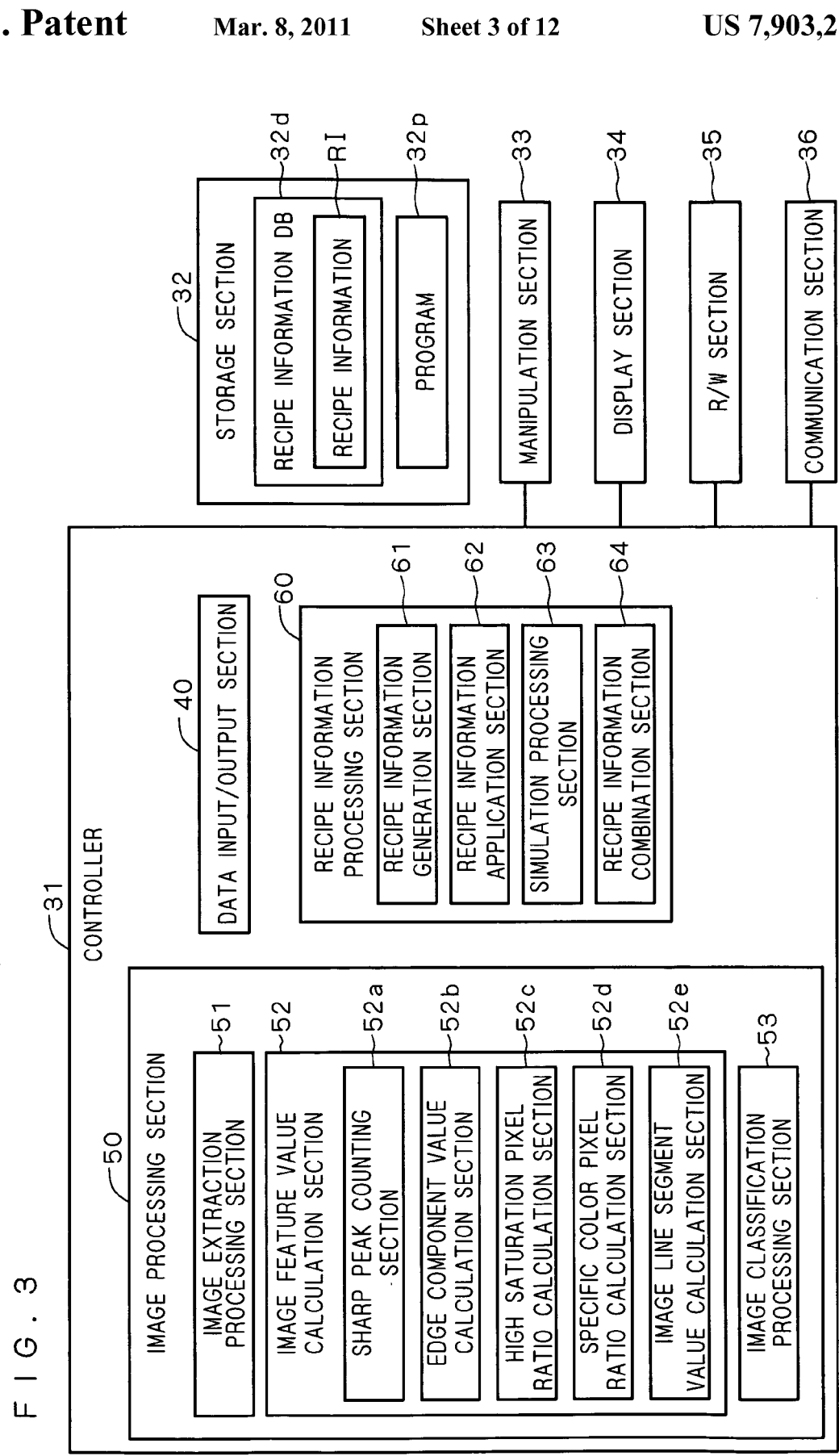
FIG. 3 illustrates functions implemented in a controller of the image processing information association processor.
Figure 4:
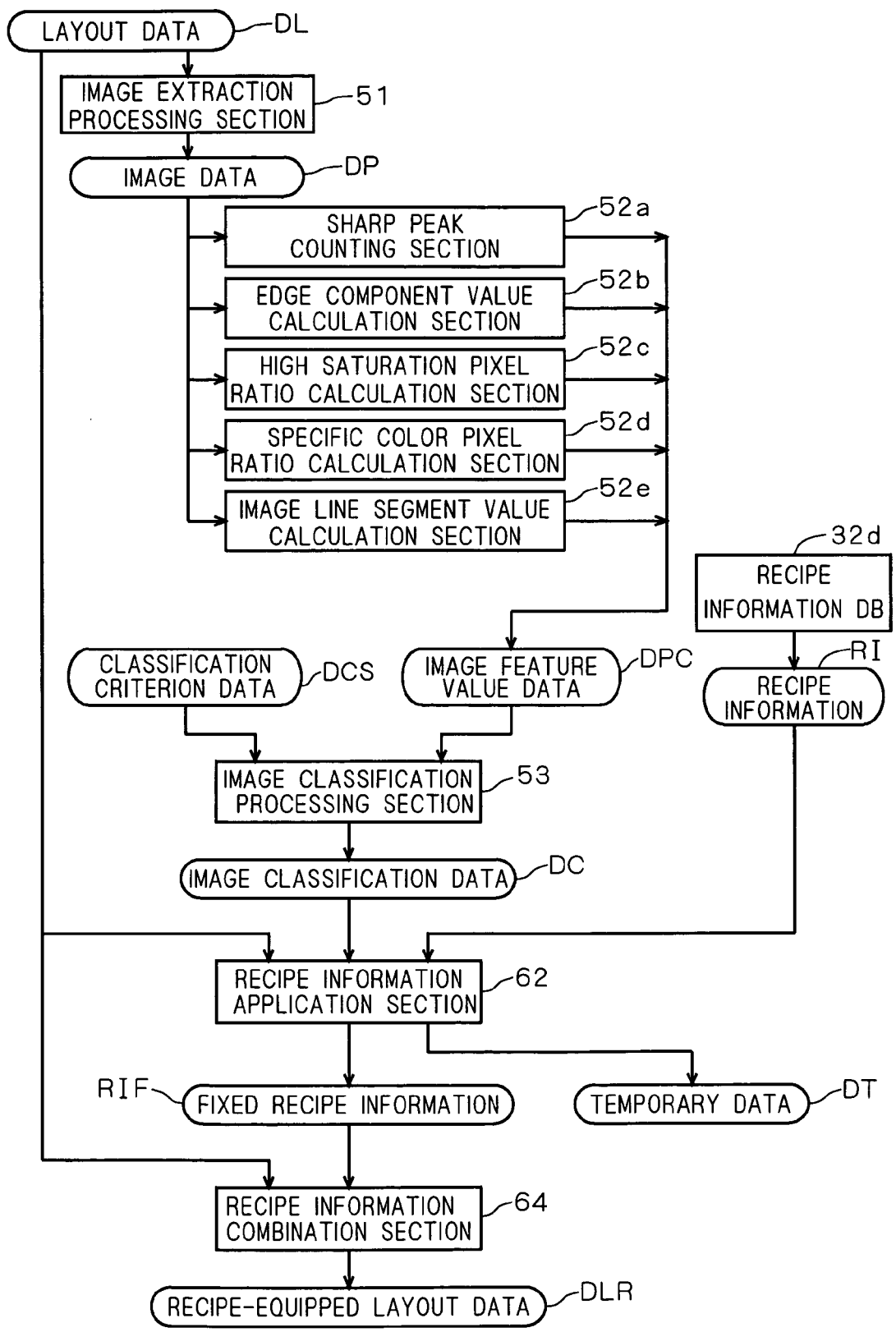
FIG. 4 is a data flow diagram in the process of adding recipe information.

FIG. 3 illustrates the functions implemented in the controller 31 of the image processing information association processor 3. FIG. 4 is a data flow diagram in the process of adding the recipe information.

A data input/output section 40, an image processing section 50 and a recipe information processing section 60 in the controller 31 are implemented by the execution of the predetermined operating program 32p stored in the storage section 32 under the action of the CPU 31a, the ROM 31b and the RAM 31c.

The data input/output section 40 is responsible for the process of reading one piece of layout data DL selected by an operator among one or more pieces of layout data DL stored in the storage section 32, and the process of storing recipe-equipped layout data DLR subjected to a predetermined process to be described later in the storage section 32 so as to be able to send the recipe-equipped layout data DLR to the output device 7.

The image processing section 50 is principally responsible for the process of extracting image data DP incorporated in the layout data DL being processed to classify the image data DP. For this process, the image processing section 50 principally comprises an image extraction processing section 51, an image feature value calculation section 52, and an image classification processing section 53.

The image extraction processing section 51 is responsible for the process (an image data extraction process) of analyzing the descriptions of the read layout data DL to extract the image data DP representing an RGB image. The layout data DL includes the descriptions of image data and text data, and layout information which are written in a predetermined page description language, for example in the PDF. The image extraction processing section 51 searches the layout data DL for a location which represents image data to extract the descriptions of the image data. It should be noted that a CMYK image represented in a CMYK color system may be previously extracted.

The image feature value calculation section 52 is responsible for the process (an image feature value calculation process) of calculating an image feature value for identifying an image feature of an RGB image PC2 represented by the extracted image data DP, based on the descriptions of the extracted image data DP. The image feature value used herein is a generic term for values obtained (counted or calculated) for use in determining which feature the RGB image PC2 has and then classifying the RGB image PC2, which will be discussed later. The image feature value calculation section 52 includes a sharp peak counting section 52a, an edge component value calculation section 52b, a high saturation pixel ratio calculation section 52c, a specific color pixel ratio calculation section 52d, and an image line segment value calculation section 52e, each of which acquires a predetermined image feature value.

The sharp peak counting section 52a is responsible for the process (a sharp peak counting process) of counting the number of sharper peaks (or taking a sharp peak count) than a predetermined limit in an RGB image represented by the image data DP. The sharp peak count refers to an image feature value indicative of the number of sharp peaks appearing in a histogram showing a distribution of the frequency of gradation levels for each color component of the RGB image. A high sharp peak count means that the image of interest has such an image feature that colors of specific gradation levels are largely outstanding. This implies that there is a high probability that the image of interest is an artificially created image such as a CG image and color-coded business graphics.

The edge component value calculation section 52b is responsible for the process (an edge component value calculation process) of calculating an edge component value of each color component of the RGB image represented by the image data DP. The edge component value refers to an image feature value indicative of the proportion of the existing edges (or points at which a gradation level change occurs sharply) to the entire image. A high edge component value means that the image of interest has an image feature of being a sharp image having a clear boundary between regions of different color components. This implies that the image of interest has been subjected to a sharpness correction and that there is a high probability that there is no need to make the sharpness correction again thereto.

The high saturation pixel ratio calculation section 52c is responsible for the process (a high saturation pixel ratio calculation process) of calculating a high saturation pixel ratio for the RGB image represented by the image data DP. The high saturation pixel ratio refers to an image feature value indicative of the proportion of pixels having a high saturation in the RGB image. In other words, the high saturation pixel ratio refers to the ratio of the area of a region occupied by the high-saturation pixels to the whole area occupied by the image. A large area of the region occupied by the high-saturation pixels in an image means that the image is a high-contrast image and is principally constructed by conspicuous color components. This implies that there is a high probability that the image is an artificially created image such as a CG image and color-coded business graphics.

The specific color pixel ratio calculation section 52d is responsible for the process (a specific color pixel ratio calculation process) of calculating a specific color pixel ratio for the RGB image represented by the image data DP. The specific color pixel ratio refers to an image feature value indicative of the proportion of pixels having gradation levels falling within a specific range in the RGB image. In other words, the specific color pixel ratio refers to the ratio of the area of a region occupied by the pixels falling within a certain gradation level (color density) range to the whole area occupied by the image. For example, an inference that a person principally appears in the image will be derived from a large number of skin color components, and an inference that a landscape principally appears in the image will be derived from a large number of blue or green components.

The image line segment value calculation section 52e is responsible for the process (an image line segment value calculation process) of calculating an image line segment value for the RGB image represented by the image data DP. The image line segment value refers to an image feature value indicative of the amount of line segments appearing in the RGB image. For example, an inference that an artificial object such as a machine, rather than a natural object such as a landscape, appears highly probably in the image will be derived from a large number of line segments drawn in the image.

These sections of the image feature value calculation section 52 calculate the various image feature values, respectively, as discussed above, thereby to provide image feature value data DPC which is a dataset containing these image feature values. A method of calculating each of the image feature values will be described later in detail.

The image classification processing section 53 is responsible for the process (an image classification process) of classifying RGB images represented by the image data DP incorporated in the layout data DL into some previously determined image categories in accordance with their image features. The image classification process is carried out by comparing the image feature value data DPC provided from the image feature value calculation section 52 with classification criterion data DCS previously determined for each image category. As a result of the image classification process, the image classification processing section 53 generates image classification data DC. This provides the classification of the plurality of RGB images arranged for the layout, based on the commonality of the features exhibited by the RGB images.

The image classification data DC may be described, for example, in the form of (k,x,1) or (k,x,0) wherein the flag "1" is given when the k-th one of the pieces of image data DP incorporated in the layout data DL meets the x-th classification criterion described in the classification criterion data DCS; otherwise the flag "0" is given.

Specific image categories are as follows. For example, when categorization (printing-suitability-based categorization) is made from the viewpoint of whether or not an image of sufficient quality is printed by the execution of only the color space conversion process from the RGB image to the CMYK image and the standard correction process, an ordinary image (natural image or unprocessed image) merely captured by a digital camera or read by a scanner and subjected to no corrections belongs to a "suitable" category. On the other hand, a CG image and business graphics (a graph image, an image for presentation, and the like) in which specific color components are selectively used so that gradation levels exhibit a discrete distribution of frequency, an image subjected to the sharpness process, an image containing much noise, a blurred image such as an out-of-focus photograph, and the like belong to an "unsuitable" category in which it is judged that a special correction must be made to print an image of good quality. In this case, the classification criterion data DCS contains, for example, the following descriptions:

Unsuitable image if $Np \geq 4$;
No need for the sharpness process (or unsuitable image) if $Lav \geq 10$;
Suitable image (or ordinary image) if $Dc=0$; unsuitable image if $Dc \neq 0$.

When categorization (image-representation-based categorization) is made according to what images represent (or image representations), images are classified into the following categories: a "person" category, a "landscape" category, a "machine" category, and the like. In this case, the classification criterion data DCS contains, for example, the following descriptions:

"Person" category if a skin color pixel ratio $\geq 0.8$;
"Landscape" category if a green pixel ratio $\geq 0.4$ and a blue pixel ratio $\geq 0.4$;
"Machine" category if the image line segment value $\geq 0.7$.

The generation and application of recipe information RI to be described below are based on the image categories each used as a unit. That is, a piece of recipe information RI is set, in principle, for each of the image categories.

The recipe information processing section 60 is responsible for the process relating to the recipe information RI. For this purpose, the recipe information processing section 60 comprises a recipe information generation section 61, a recipe information application section 62, a simulation processing section 63, and a recipe information combination section 64.

The recipe information generation section 61 is responsible for the process of generating the recipe information RI to store the recipe information RI in a recipe information database (DB) 32d provided in the storage section 32. As shown in FIG. 2, the pieces of recipe information RI stored in the recipe information DB 32d are displayed together with respective recipe icons IC in a recipe information list box F3 of the working window W.

Figure 5:
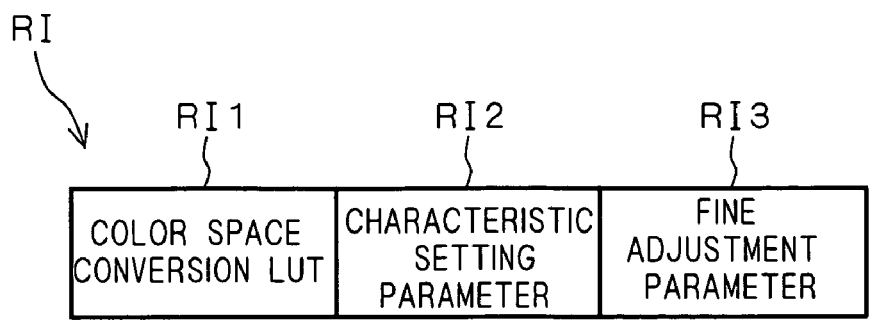
FIG. 5 schematically shows a structure of the recipe information.

The recipe information RI will be described. The recipe information RI refers to processing information about the details of the optimization process for printing to be performed in the output device 7 upon the image data DP incorporated in the layout data DL received as the original prior to the output process. The recipe information RI is described in the same description format as the layout data DL. Thus, when the layout data DL is described in the PDF, the recipe information RI is also described in the PDF. If images arranged for the layout in the printing original belong to the same image category, it is considered that a color component desired to be enhanced and a consideration in color reproduction are common to the images. Therefore, the recipe information RI is preferably set for each of the image categories and previously entered in the recipe information DB 32d. FIG. 5 schematically shows a structure of the recipe information RI. As shown in FIG. 5, the recipe information RI includes a color space conversion look-up table (LUT) RI1, a characteristic setting parameter RI2, and a fine adjustment parameter RI3.

The color space conversion look-up table RI1 is set for reference during the color space conversion process for maintaining in the printed matter the color reproduction of the RGB images arranged for the layout in the printing original, the color space conversion process being included in the optimization process for printing. For example, a conversion from the original RGB color space to a color space represented based on Japan Color 2001 is set.

Figure 6:
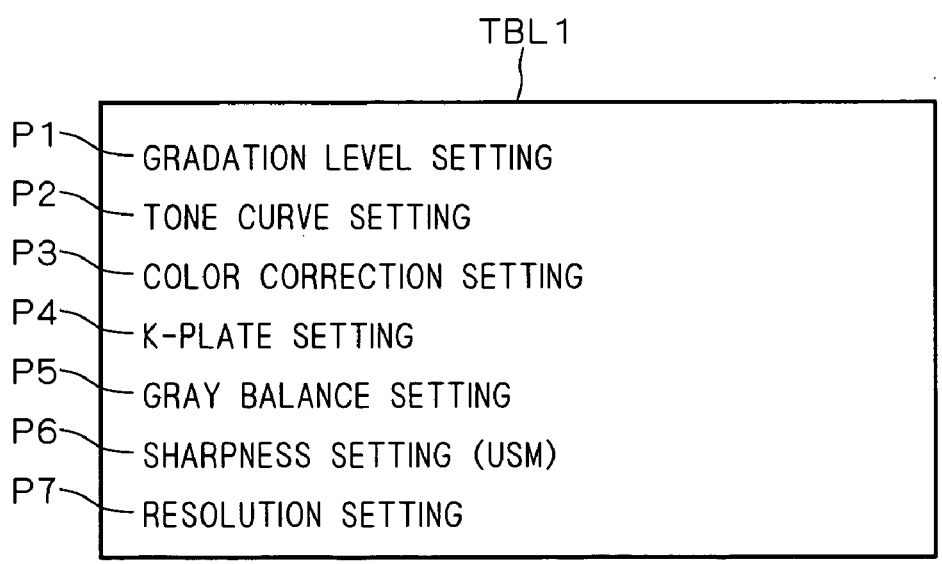
FIG. 6 shows a setting item table including a list of setting items of a characteristic setting parameter.

The characteristic setting parameter RI2 is a setting parameter which determines the specific details of the image correction process to be performed on the image data DP, the image correction process being included in the optimization process for printing. FIG. 6 shows a setting item table TBL1 including a list of setting items of the characteristic setting parameter RI2. The specific settings for the respective items of the characteristic setting parameter RI2 shown in FIG. 6 are appropriately made in accordance with the features of the images belonging to each image category.

The items of the characteristic setting parameter RI2 will be described one by one. A gradation level setting P1 is an item for setting the density range of halftone dots. A tone curve setting P2 is an item for setting a mid-tone or a half tone by means of a tone curve. A color correction setting P3 is an item for correcting a deviation from an ideal color characteristic of an ink. A K-plate setting P4 is an item for setting UCR (under color removal), GCR (gray component replacement) and the like for replacing an overlap between CMY colors with a K plate. A gray balance setting P5 is an item for setting a balance between CMY colors for proper gray representation. A sharpness setting P6 is an item for enhancing the sharpness of an image by the use of USM (unsharp masking) or the like. A resolution setting P7 is an item for converting the resolution of an image in an pixel interpolation process or the like.

FIG. 7 shows a corresponding relationship between image categories determined based on a certain piece of classification criterion data DCS and the details of the image correction process to be performed, prior to printing, upon images belonging to the respective image categories in the form of a correction detail table TBL2 by way of illustration. The characteristic setting parameter RI2 of the recipe information RI is set so that the details of the correction process shown in FIG. 7 are implemented on the images belonging to the respective image categories. As shown in FIG. 2, when an operator selects one of the plurality of pieces of recipe information RI listed in the recipe information list box F3 of the working window W, the detail of the corresponding correction process in the correction detail table TBL2 is displayed in a recipe information detail display box F4. In FIG. 2, "machine" recipe information is shown as selected.

When the color space conversion look-up table RI1 and the characteristic setting parameter RI2 of the recipe information RI are appropriately set, the output device 7 performs the optimization process on the image data in accordance with the descriptions of the recipe information RI and thereafter performs the output process. If the printing original is received in the form of the RGB original, the execution of such an optimization process provides the output of printed matter of good quality.

The fine adjustment parameter RI3 is a parameter to be set for operator's further addition of a fine adjustment to each item of the characteristic setting parameter RI2. Since a piece of recipe information RI is set, in principle, for each of the image categories as described above, it is considered appropriate to perform the same optimization process on the image data DP about images belonging to the same image category. However, because images belonging to the same image category slightly differ from each other in what they express, the uniform execution of the optimization process using the same piece of recipe information RI is not always an actually "optimum" process for the images. For use in such a case, the fine adjustment parameter RI3 is a parameter corresponding to an amount by which a default setting of the characteristic setting parameter RI2 is changed for manual fine adjustment to achieve a truly "optimum" process. A preferable form of the actual execution of the fine adjustment is to set the fine adjustment parameter RI3 in accordance with a processing menu of typical details of adjustment previously prepared. FIG. 8 shows a fine adjustment menu table TBL3 including a typical processing menu for setting of the fine adjustment parameter RI3 in list form.

Returning to the description of the recipe information processing section 60, the recipe information application section 62 is responsible for a process (a recipe information association process) in which the operator associates the recipe information RI with the image data DP incorporated in the layout data DL. The recipe information application section 62 is also responsible for the process of modifying the recipe information once associated, and the like. The recipe information association process refers to the process of associating a piece of recipe information RI suitable for each piece of image data DP incorporated in the layout data DL with the layout data DL.

The recipe information application section 62 generates temporary data DT in which the applied piece of recipe information RI is associated with the layout data DL or the image data DP incorporated in the layout data DL. That is, the generation of the temporary data DT is the essential process of the recipe information association process. The temporary data DT may be generated by directly appending the recipe information RI to the layout data DL in a manner similar to the action to be achieved in the recipe information combination section 64 to be described later or by giving association information to the layout data DL or the recipe information RI to generate a dataset comprised of both thereof. The temporary data DT is used for an image simulation process in the simulation processing section 63 to be described later. The operator may click a delete button BT2 to erase all of the associated pieces of recipe information and then reexecute the recipe information association process under the action of the recipe information application section 62.

The simulation processing section 63 is responsible for the process (a simulation process) of simulating, in the working window W, the optimization process for printing to be performed in the output device 7 upon the image data DP incorporated in the layout data DL based on the temporary data DT. Further, the operator may click a print button BT3 to cause a proofing device 4 such as a color ink jet printer connected, for example, through a connection cable CB5 to perform proof printing based on the temporary data DT.

The recipe information combination section 64 is responsible for the process (a recipe information addition process) of combining or adding fixed recipe information RIF with or to the layout data DL, the fixed recipe information RIF being the recipe information RI obtained when the operator judges that the recipe information RI is appropriately set as a result of the above-mentioned simulation process and the like. Thus, the recipe information combination section 64 generates the recipe-equipped layout data DLR which is the layout data DL with the recipe information RI added thereto.

The recipe-equipped layout data DLR thus obtained is stored in the storage section 32 so as to be sendable to the output device 7. The recipe-equipped layout data DLR is transferred to the output device 7 as appropriate, and is subjected to a predetermined process.

The output device 7 is a device for performing a predetermined process on the layout data received from the image processing information association processor 3 to output printed matter. Prior to the output process, the output device 7 according to this preferred embodiment performs the optimization process for printing based on the descriptions of the fixed recipe information RIF, that is, the color space conversion process and image correction process optimum for what individual images express. The output device 7 comprises: a controller 71 including a CPU 71a, a ROM 71b and a RAM 71c for implementing functions to be described later; a storage section 72; a manipulation section 73; a display section 74; an R/W section 75; a communication section 76, and the like, the functions of which are implemented by a computer. The output device 7 further comprises a printing section 77 for printing on a predetermined printing sheet.

Figure 9:
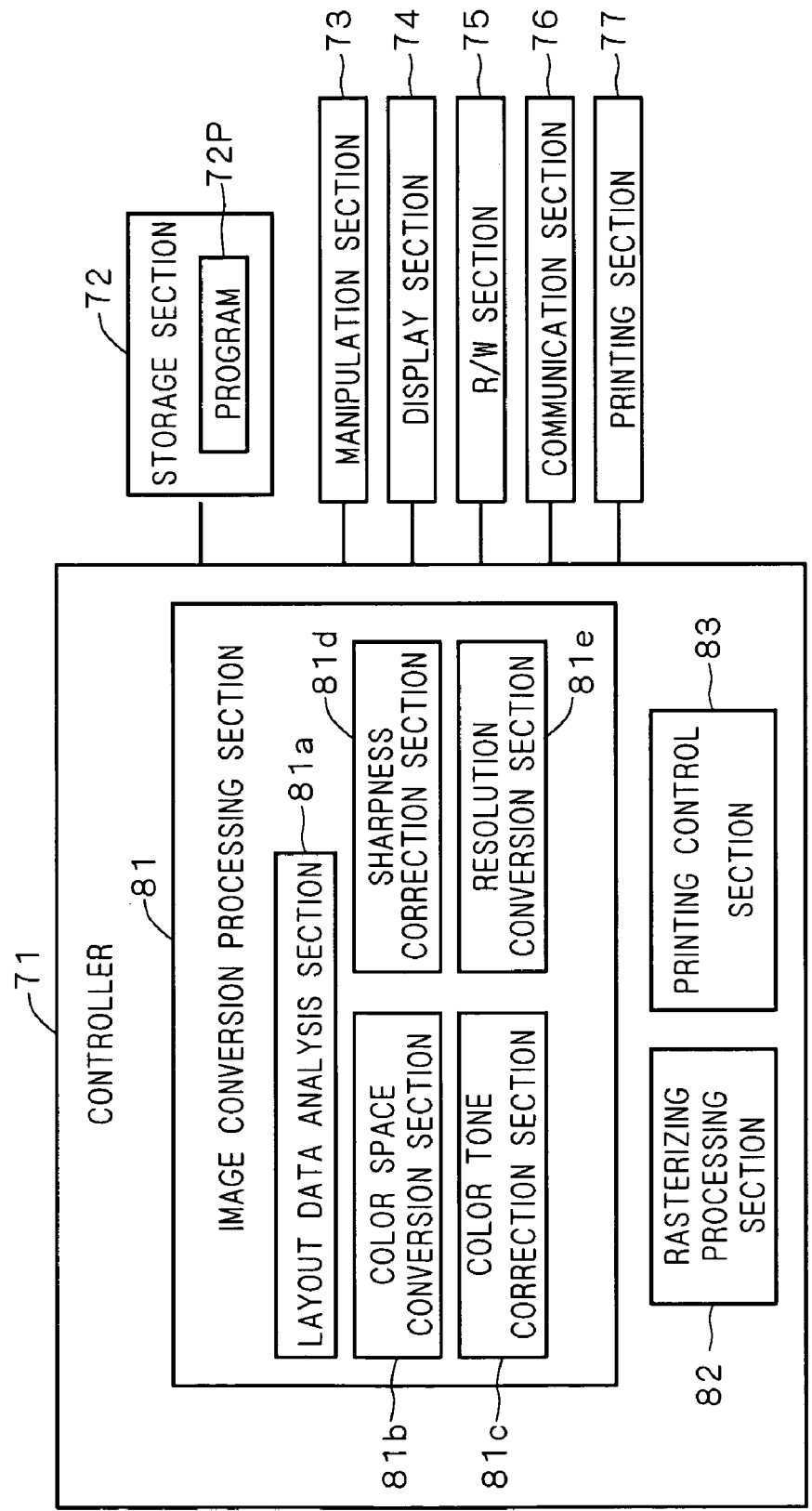
FIG. 9 illustrates functions implemented in a controller of an output device.

FIG. 9 illustrates the functions implemented in the controller 71 of the output device 7. An image conversion processing section 81, a rasterizing processing section 82 and a printing control section 83 in the controller 71 are implemented by the execution of a predetermined program 72p stored in the storage section 72 under the action of the CPU 71a, the ROM 71b and the RAM 71c.

The image conversion processing section 81 is provided for performing the optimization process on the image data DP contained in the recipe-equipped layout data DLR received from the image processing information association processor 3, in accordance with the descriptions of the recipe information RI added to the recipe-equipped layout data DLR by the image processing information association processor 3.

To this end, the image conversion processing section 81 principally comprises a layout data analysis section 81a, a color space conversion section 81b, a color tone correction section 81c, a sharpness correction section 81d, and a resolution conversion section 81e.

The layout data analysis section 81a analyzes the descriptions of the recipe-equipped layout data DLR to extract the recipe information RI incorporated in the recipe-equipped layout data DLR and the image data DP to be subjected to the optimization process based on the recipe information RI.

The color space conversion section 81b performs a CMYK conversion process on the image data DP in accordance with the color space conversion look-up table RI1 described in the recipe information RI.

The color tone correction section 81c performs a density level correction and a tone curve correction on the CMYK-converted image data in accordance with the descriptions of the characteristic setting parameter RI2 and the fine adjustment parameter RI3 of the recipe information RI. The sharpness correction section 81d performs an USM correction in accordance with the descriptions of the recipe information RI. The resolution conversion section 81e converts the resolution of an image in accordance with the descriptions of the recipe information RI. The recipe-equipped layout data DLR (referred to hereinafter as optimized layout data) in which all of the pieces of image data DP incorporated therein are subjected to the processes in these sections is temporarily stored in the storage section 72, and is then provided to the rasterizing processing section 82.

The rasterizing processing section 82 is provided for rasterizing (or performs the RIP or rasterization process on) the optimized layout data to provide raster data processable in the printing section 77 and corresponding to the plates of respective CMYK colors. A known technique may be used as the rasterizing process technique.

The printing control section 83 is provided for controlling the execution of printing in the printing section 77. In accordance with the control of the printing control section 83, the printing section 77 performs printing on a predetermined printing sheet, based on the data for the plates of respective colors obtained by the rasterizing process.

Although the output device 7 is responsible for both of the rasterizing process and the printing process in this preferred embodiment, the rasterizing process and the printing process may be performed by separate devices, respectively.

<Flow of Process of Adding Recipe Information>

Figure 10:
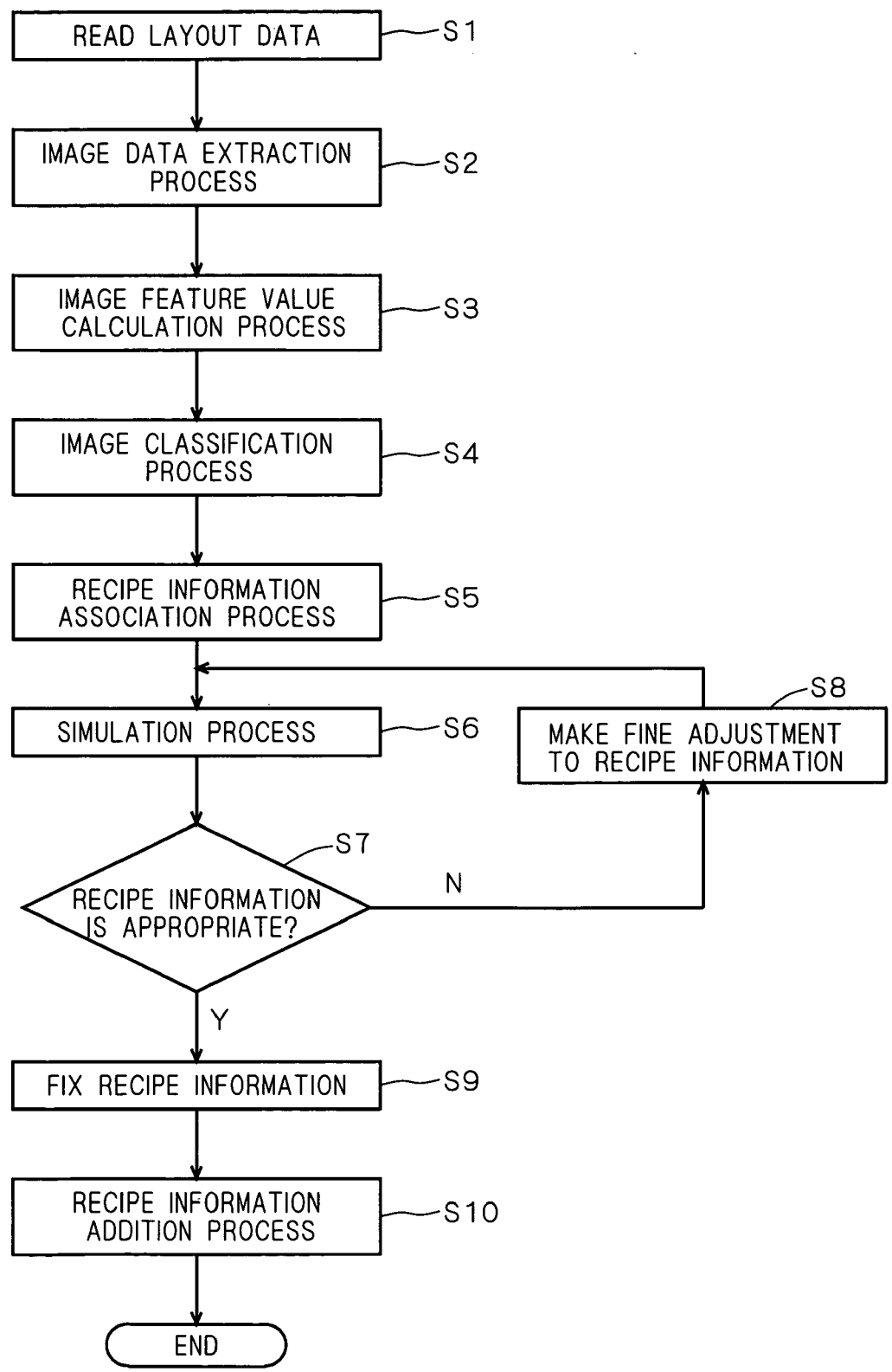
FIG. 10 is a flow diagram for illustrating the process of adding the recipe information to layout data.

FIG. 10 is a flow diagram for illustrating the process of adding the recipe information RI to the layout data DL. The process of adding the recipe information RI starts with the process of reading the layout data DL to be processed under the action of the data input/output section 40 (in Step SI). When the layout data DL is read, a page layout image PL1 is displayed (on a reduced scale) in a layout image display box F1 of the working window W, as shown in FIG. 2. In the example shown in FIG. 2, the layout data DL to be processed is described in the PDF, has a file name "leaflet.pdf" and represents a printing original with a total of five pages, and the third page thereof is shown as displayed as the page layout image PL1. It is assumed that the third page has four RGB images PC1 to PC4 arranged thereon.

After the layout data DL is read, the image data extraction process is performed under the action of the image extraction processing section 51 (in Step S2). The pieces of image data DP corresponding to the respective RGB images PC1 to PC4 are extracted and temporarily held in the RAM 31c. Also, in the example shown in FIG. 2, corresponding thumbnail images PS1 to PS4 are displayed in list form in an image display column F21 of a recipe application box F2 of the working window W.

After all of the pieces of image data DP are extracted, the image feature value calculation process is performed (in Step S3). The image feature value calculation process performed in this step includes the sharp peak counting process under the action of the sharp peak counting section 52a, the edge component value calculation process under the action of the edge component value calculation section 52b, the high saturation pixel ratio calculation process under the action of the high saturation pixel ratio calculation section 52c, the specific color pixel ratio calculation process under the action of the specific color pixel ratio calculation section 52d, and the image line segment value calculation process under the action of the image line segment value calculation section 52e.

Figure 11:
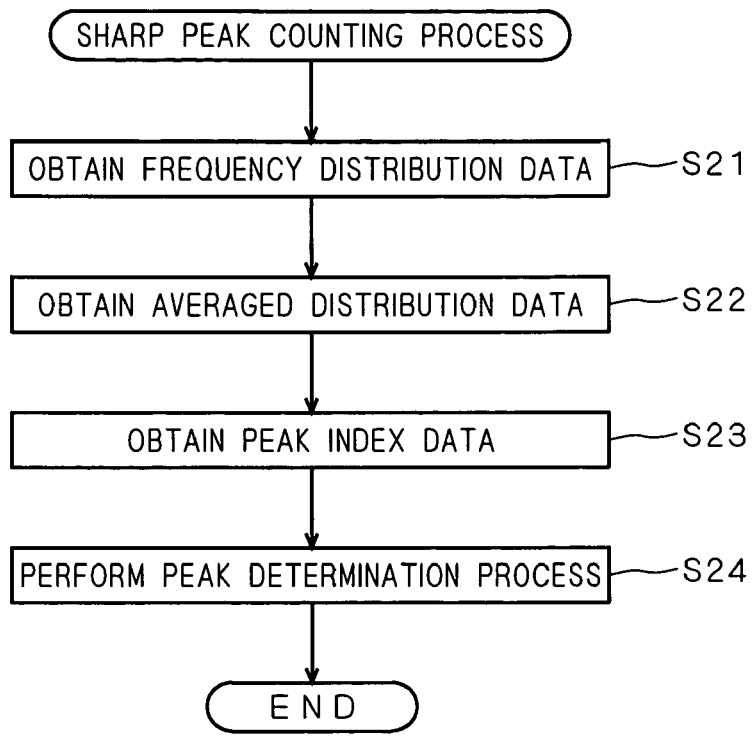
FIG. 11 is a process flow diagram in a sharp peak counting section.

FIG. 11 is a flow diagram of the sharp peak counting process for counting the number of sharper peaks than a predetermined limit. An example will be described in which the image data DP represents an image composed of m×n pixels each containing R (red), G (green) and B (blue) color components with a 256-level gradation for representation of an 8-bit image. The gradation levels of a pixel (i,j) (where i and j are positive integers) in the image data DP are expressed as (R(i,j), G(i,j), B(i,j)) (where 0≦R(i,j), G(i,j), B(i,j)≦255; and R(i,j), G(i,j), B(i,j) are positive integers).

In the sharp peak counting process, frequency distribution data is obtained by counting the number of pixels with (or the frequency of) each of the gradation levels ranging from 0 to 255 (in Step S21). It is assumed that the frequency distribution data Hb(c,L) indicates the frequency of a gradation level L (where L=1 to 255; and L is a positive integer) for a color component c wherein c=0, 1, 2 corresponding to flags indicating R, G, B, respectively.

Next, an averaging process for averaging the frequencies of adjacent gradation levels, based on the obtained frequency distribution data is performed to provide averaged distribution data (in Step S22). The averaging process is carried out, for example, by averaging the frequencies of gradation levels lying within an averaging range Rp with respect to each gradation level. As an example, when Rp=3, the averaged distribution data Hbf(c,L) is given by $$Hbf(c, L) = (Hb(c, L-1) + Hb(c, L) + Hb(c, L+1))/3 \quad (1)$$

where 2≦L≦254.

After the averaged distribution data is obtained, a peak index calculation process is performed based on the averaged distribution data to calculate peak index data for use in a peak determination process for determining whether or not each of the gradation levels is at a peak position in the frequency distribution histogram (in Step S23). The peak index data Hbp(c,L) is calculated by $$Hbp(c, L)=(Hb(c, L)-Hbf(c, L))/(Hbf(c, L)+mn/4096.0) \quad (2)$$

The peak determination process is performed using the calculated peak index data (in Step S24). In the peak determination process, a determination is made as to whether or not a peak index is greater than a peak threshold value Tp previously determined as a criterion of determination as to whether or not a peak is sharper than the predetermined limit. In other words, a determination is made as to whether or not $$Hbp(c, L) > Tp \quad (3)$$

is satisfied for all of values of c and L.

Then, the number of gradation levels L satisfying Inequality (3) is counted for each color component. Adding the resultant counts for all of the color components together provides a sharp peak count Np for the image data DP.

Figure 12:
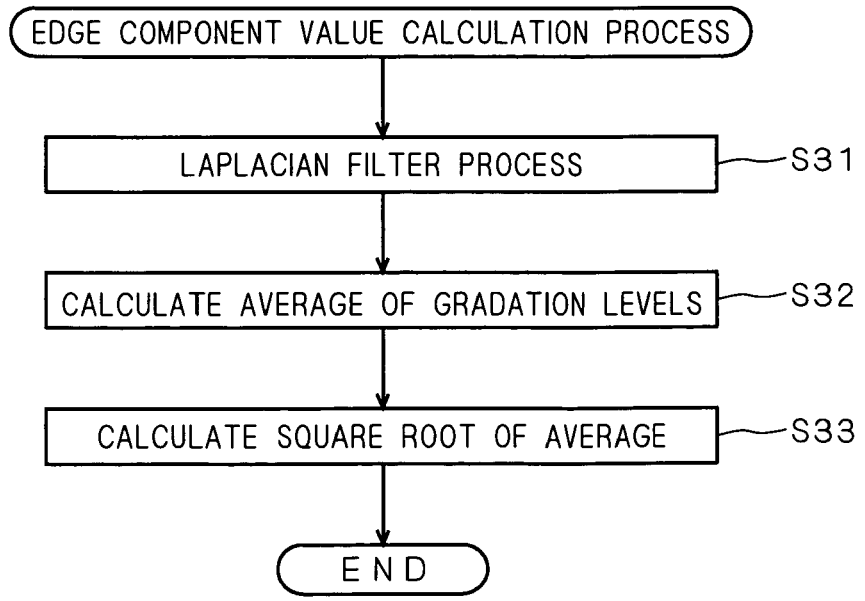
FIG. 12 is a process flow diagram in an edge component value calculation section.

FIG. 12 is a flow diagram of the edge component value calculation process. In the edge component value calculation process, a calculation process (or a Laplacian filter process) for applying a 3×3 Laplacian filter FT1 shown in FIG. 15 to the gradation levels of the respective pixels is performed for each color component (in Step S31). For example, a gradation level Rf(i,j) subjected to the Laplacian filter process for the R color component of the pixel (i,j) is given by $$Rf(i, j)=4\times R(i, j)-R(i-1, j)-R(i, j-1)-R(i+1, j)-R(i, j+1) \quad (4)$$

The result of the calculation of Equation (4) shall be replaced with Rf(i,j)=−256 if Rf(i,j)≦−256. The result of the calculation of Equation (4) shall be replaced with RF(i,j)=256 if Rf(i,j)≧255.

Next, the average of the absolute values of the gradation levels obtained by the Laplacian filter process for all of the pixels is calculated for each color component (in Step S32). Adding the resultant averages for all of the color components together provides an average edge value. The average edge value Lav is obtained by $$Lav=\{(\Sigma|RF(i, j)|)+(\Sigma|Gf(i, j)|)+(\Sigma|Bf(i, j)|)\}/mn \quad (5)$$

After the average edge value is obtained, the square root of the average edge value is then calculated (in Step S33). The resultant square root is defined as the edge component value. That is, the edge component value E is obtained by $$E=(Lav)^{1/2} \quad (6)$$

Alternatively, an edge component value for each of the color components may be calculated by calculating the square root for each of the color components as expressed in Equation (6), rather than adding the averages for all of the color components together in Equation (5).

Figure 13:
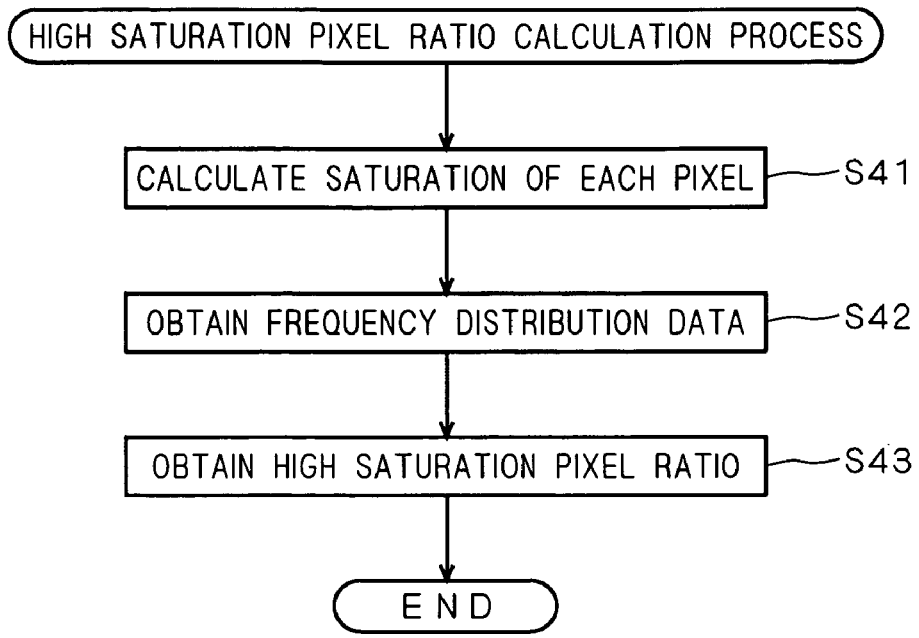
FIG. 13 is a process flow diagram in a high saturation pixel ratio calculation section.

FIG. 13 is a flow diagram of the high saturation pixel ratio calculation process. In the high saturation pixel ratio calculation process, the saturations of the respective pixels are calculated (in Step S41). The saturation C(i,j) of the pixel (i,j) is obtained by $$C(i, j)=\{(R(i, j))^2+(G(i, j))^2+(B(i, j))^2-R(i, j)\times G(i, j)-G(i, j)\times B(i, j)-B(i, j)\times R(i, j)\} \quad (7)$$

Next, frequency distribution data is obtained by counting the number of pixels with (or the frequency of) each of the gradation levels ranging from 0 to 255, based on the obtained saturations of the respective pixels (in Step S42). It is assumed that the frequency distribution data Hc(L) indicates the frequency of a gradation level L (where L=1 to 255; and L is a positive integer).

The high saturation pixel ratio is calculated using the obtained frequency distribution data (in Step S43). The ratio of the number of pixels (a high saturation pixel count) Nc which have a saturation greater than a previously determined saturation threshold value Thc, that is, which satisfy $$Hc(L) > Thc \quad (8)$$

to the total number of pixels mn is given as the high saturation pixel ratio Dc. That is, the high saturation pixel ratio Dc is $$Dc=Nc/mn \quad (9)$$

In the specific color pixel ratio calculation process, the number of specific color pixels is counted (or a specific color pixel count is taken), and the specific color pixel ratio is obtained as the ratio of the number of specific color pixels to the total number of pixels mn. For example, the specific color pixel ratio Dr for the R color component is $$Dr=Nr/mn \quad (10)$$

where Nr is the specific color pixel count. The specific color pixel count Nr, for example, for the R color component is the number of pixels which meet one of the following three conditions:

(a) To have a gradation level greater than a previously determined gradation level threshold value T(R), that is, to satisfy $$R(i, j) > T(R) \quad (11)$$

(b) To have a gradation level less than the threshold value T(R), that is, to satisfy $$R(i, j) < T(R) \quad (12)$$

(c) To have chromaticity lower than that of pixels having a gradation level ranging between gradation level threshold values T1(R) and T2(R), that is, to satisfy $$T1(R) < R(i, j) < T2(R) \quad (13)$$

Inequalities (11) to (13) are selected as appropriate depending on the range of gradation levels desired to be extracted. In the above example, the specific color pixel ratio is calculated under the threshold value conditions for one color component. Additionally, the ratio of the number of pixels which meet all threshold value conditions for the respective R, G and B color components to the total number of pixels may be calculated.

Figure 14:
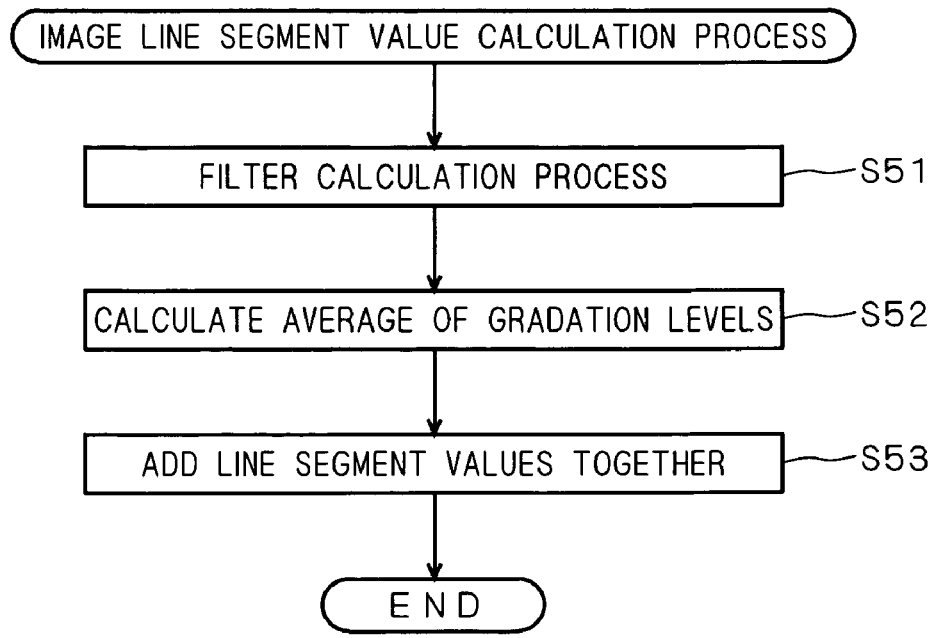
FIG. 14 is a process flow diagram in an image line segment value calculation section.

FIG. 14 is a flow diagram of the image line segment value calculation process. In the image line segment value calculation process, the following four line segment values are first calculated: a vertical line segment value, a horizontal line segment value, a first inclined line segment value (about a line segment slanting upwardly and rightwardly), and a second inclined line segment value (about a line segment slanting upwardly and leftwardly). For calculation of the vertical line segment value, a filter calculation process (or a vertical line segment filter process) for applying a 3×3 vertical line segment extraction filter FT2 shown in FIG. 16A to the gradation levels of the respective pixels is performed for each color component (in Step S51). For example, a gradation level R1(i,j) subjected to the vertical line segment filter process for the R color component of the pixel (i,j) is calculated by $$R1(i, j)=2\times\{R(i, j)+R(i-1, j)+R(i+1, j)\}-R(i-1,j-1)-R(i-1, j)-R(i-1, j+1)-R(i+1, j-1)-R(i+1, j)-R(i+1, j+1) \quad (14)$$

Next, the average of the gradation levels R1(i,j) obtained by the vertical line segment filter process for all of the pixels is calculated for each color component (in Step S52). Adding the resultant averages for all of the color components together provides the vertical line segment value. The vertical line segment value L1av is obtained by $$L1av=\{(\Sigma R1(i,j))+(\Sigma G1(i,j))+(\Sigma B1(i,j))\}/mn \qquad (15)$$

For the horizontal, first inclined and second inclined line segment values, similar filter calculation processes are performed by applying a horizontal line segment extraction filter FT3 shown in FIG. 16B, a first inclined line segment extraction filter FT4 shown in FIG. 16C (for a line segment slanting upwardly and rightwardly), and a second inclined line segment extraction filter FT5 shown in FIG. 16D (for a line segment slanting upwardly and leftwardly) to calculate the horizontal line segment value L2av, the first inclined line segment value L3av, and the second inclined line segment value L4av, respectively.

Adding the above-mentioned four line segment values together (in Step S53) provides the image line segment value. That is, the image line segment value Lpav is calculated by $$Lpav=L1av+L2av+L3av+L4av \qquad (16)$$

The sections of the image feature value calculation section 52 calculate the various image feature values, respectively, as discussed above, thereby to provide the image feature value data DPC which is a dataset containing these image feature values. Thus, the image feature value data DPC about the k-th one of the pieces of image data DP incorporated in the layout data DL is described, for example, in the form of (k,Np,Lav,Dc,Dr,Lpav). The method of calculating the image feature values and the description format as described hereinabove are only illustrative, but may be modified in other forms.

After the image feature values are calculated, the image classification process is performed on all of the pieces of image data DP incorporated in the layout data DL under the action of the image classification processing section 53 (in Step S4). When the image classification data DC is generated by the image classification process, all of the image categories to which the RGB images contained in the printing original belong are displayed in list form in an image category list box F5 of the working window W, as shown in FIG. 2. Also, the image categories to which the individual RGB images PC1 to PC4 are classified are displayed in corresponding relation to the respective thumbnail images PSI to PS4 in an image category display column F22 of the recipe application box F2 of the working window W. Although shown as displayed on a page-by-page basis in FIG. 2, the thumbnail images PS1 to PS4 may be displayed for each image category, based on the image classification data DC. In such a case, the operator may select a specific image category in the image category list box F5 to cause only the thumbnail images of the RGB images belonging to the specific category to be displayed. Further, thumbnail images of the CMYK images incorporated in the layout data DL may be additionally displayed in the recipe application box F2. It is assumed that a thumbnail image PS5 illustrates such a CMYK image in FIG. 2.

After the image classification process, the operator then performs the recipe information association process (in Step S5). The manipulation by the operator is made in the working window W shown in FIG. 2. As discussed above, after the completion of the recipe information association process, all of the image categories to which the RGB images contained in the printing original belong are displayed in list form in the image category list box F5. Using a mouse (not shown) or the like provided in the manipulation section 33, the operator drags and drops (D&D) the recipe icon IC of a piece of recipe information RI desired to be applied to a certain image category (i.e., an image belonging to the certain image category) into the position of the certain image category in the image category list box F5 of the working window W. In response to the selection by the drag-and-drop operation, the recipe information application section 62 generates the temporary data DT in which the piece of recipe information RI applied by the above-mentioned drag-and-drop operation is associated with one or more pieces of image data about one or more RGB images belonging to the image category of interest among all of the pieces of image data DP incorporated in the layout data DL. This results in the simultaneous application of the same piece of recipe information RI to all of the images belonging to the same image category, thereby to reduce the complexity of processing even if a multiplicity of images are arranged for the layout. The temporary data DT may be generated by directly appending the recipe information RI to the layout data DL in a manner similar to the action of the recipe information combination section 64 to be described later or by giving association information indicative of the association between the layout data DL and the recipe information RI to either the layout data DL or the recipe information RI while the layout data DL and the recipe information RI are held separate.

At the same time that the association is established by the temporary data DT, a display indicative of the applied piece of recipe information RI is produced in a location corresponding to each image belonging to the corresponding category in a set recipe display column F23 of the recipe application box F2 of the working window W. This enables the operator to visually recognize how the association is established. In FIG. 2, a piece of recipe information RI designated as "Landscape +Machine" is shown as set for the "landscape" category, a piece of recipe information RI designated as "Machine" is shown as set for the "machine" category, and a piece of recipe information RI designated as "Standard" is shown as set for the "suitable" category.

In place of the above-mentioned application of the same recipe information RI for each image category, the application of the recipe information RI on an image-by-image basis may be carried out by dragging and dropping a recipe icon IC into an RGB image displayed in the layout image display box F1 or into a thumbnail image displayed in the recipe application box F2.

After the recipe information RI is applied to the image data DP, a simulation process is performed to judge whether or not the application is appropriate (in Step S6). In the example shown in FIG. 2, the operator selects one of the thumbnail images PSI to PS4 displayed in the recipe application box F2 and subjected to the application of the recipe information RI. In response to the selection, the simulation processing section 63 displays in a simulation image display box F6 a simulation image PSM obtained by simulating an image to be outputted after the optimization process in accordance with the recipe information RI by the output device 7 while referring to the descriptions of the piece of image data DP corresponding to the selected thumbnail image and the piece of recipe information RI associated with the piece of image data DP among the descriptions of the temporary data DT. This enables the operator to consider whether or not the application of the piece of recipe information RI is appropriate, based on the simulation image PSM. In FIG. 2, the simulation process is shown as performed on the RGB image PC2.

When the operator that views the simulation image PSM judges that the setting of the piece of recipe information RI is not appropriate (NO in Step S7), the operator can enter a command by clicking a recipe information fine adjustment button BT1, thereby to make a fine adjustment to the associated piece of recipe information RI (in Step S8). Clicking the recipe information fine adjustment button BT1 produces a display of predetermined items of the fine adjustment menu, for example, as shown in FIG. 8 in a fine adjustment setting box F7. When the operator makes a manipulation as appropriate in accordance with the displayed menu to execute a command entry, a parameter of the associated piece of recipe information RI is adjusted under the action of the recipe information application section 62, whereby the temporary data DT is rewritten by the modification of the associated piece of recipe information RI. The simulation process may be performed again based on the rewritten temporary data DT.

When the operator judges that the recipe information RI applied to all of the images is appropriate and clicks an OK button BT4, the applied recipe information RI is fixed to provide the fixed recipe information RIF at this point of time (in Step S9). When the operator clicks a cancel button BT5, the recipe information addition process is completely cancelled.

In response to the above-mentioned click of the OK button BT4, the recipe information combination section 64 performs the recipe information addition process (in Step S10). The recipe information addition process is achieved by appending the fixed recipe information RIF to the layout data DL. Appending the recipe information RI to the layout data DL provides the recipe-equipped layout data DLR. Preferably, an RGB image and a piece of fixed recipe information RIF corresponding thereto are paired with each other in the descriptions of the recipe-equipped layout data DLR. The fixed recipe information RIF corresponding to an image present on a certain page is at least described on the page.

The recipe-equipped layout data DLR thus obtained is transferred to the output device 7. In the output device 7, the optimization process for printing based on the descriptions of the fixed recipe information RIF, that is, the color space conversion process and image correction process optimum for what individual images express are performed on the individual images, prior to the output process, under the action of the sections constituting the image conversion processing section 81 implemented in the controller 71. Thereafter, the rasterizing process of the rasterizing processing section 82 and the printing process are executed.

As discussed hereinabove, when the printing original is layout data containing RGB images, the present invention achieves the addition to the layout data, of the recipe information necessary for the output device to perform the process (or the optimization process) of optimizing RGB image data contained in the layout data for printing while associating the recipe information with the respective image data, based on the image features of the image data. This enables the output device to output good-quality printed matter excellent in color reproduction and the like if information for the process of optimizing the RGB image data is not previously provided during the generation of the layout data.

Further, the plurality of RGB images arranged for the layout are classified based on the commonality of the features exhibited by the RGB images, and the same piece of recipe information is applied to RGB images belonging to the same image category at the same time. This reduces the complexity of processing even if a multiplicity of images are arranged for the layout. Moreover, the simulation can be done to judge whether or not the optimization process based on the applied piece of recipe information is appropriate, and the applied piece of recipe information is fine-adjustable. This allows the application of a piece of recipe information most suitable for what the individual images express, and the provision of the most suitable piece of recipe information to the optimization process in the output device.

The image processing information association processor according to this preferred embodiment may be provided in the output process step responsible for the output process to make a check of the layout data received as the original prior to the output process. Alternatively, the image processing information association processor may be provided in a design/production process step for generating the layout data, in which case the image processing information association processor is used during the receipt of the layout data as the original to suitably perform image processing, and thereafter transfers the original to the output process step. The latter also makes a kind of preflight check of the layout data. In the former, the image processing information association processor may be constructed, for example, integrally with the output device. In the latter, the image processing information association processor may be constructed, for example, integrally with the layout data generation device.

While the invention has been described in detail, the foregoing description is in all aspects illustrative and not restrictive. It is understood that numerous other modifications and variations can be devised without departing from the scope of the invention.

What is claimed is:

1. A printing system comprising:
   a) an output device including
      a-1) an image processing element for performing predetermined image processing on each of said pieces of RGB image data contained in said layout data, based on said associated one of said plurality of pieces of image processing information, said predetermined image processing being a process of converting each of said one or more pieces of RGB image data into a piece of image data capable of being subjected to an output process, and
      a-2) an output processing element for performing said output process, based on layout data containing said pieces of RGB image data subjected to said predetermined image processing; and
   b) an image processing information association processor for performing an association process, said association process being the process of associating image processing information necessary for the output device to perform the predetermined image processing with each of a plurality of pieces of RGB image data contained in layout data described by descriptions in a page description language, said image processing information association processor including
      b-1) an image processing information storage element for storing therein a plurality of pieces of image processing information different in detail of processing from each other,
      b-2) a layout data reading element for reading layout data containing pieces of RGB image data,
      b-3) an image data extraction element for extracting said pieces of RGB image data from said layout data by searching the descriptions with respect to said pieces of RGB image data in said layout data,
      b-4) an image feature value calculation element for calculating at least one image feature value for each of said pieces of RGB image data extracted,
      b-5) an image classification element for making a comparison between said at least one image feature value and a predetermined classification criterion to classify said pieces of RGB image data into a plurality of image categories in accordance with a result of the comparison, said plurality of image categories being previously determined in accordance with said classification criterion, b-6) an association processing element for associating a selected one of said plurality of pieces of image processing information with each of said pieces of RGB image data, b-7) a combination element for combining the associated one of said plurality of pieces of image processing information with said layout data, b-8) a simulation processing element simulating said predetermined image processing to be performed by said output device on said pieces of RGB image data, based on said associated one of said plurality of pieces of image processing information, and b-9) a fine adjustment element for making a fine adjustment to said associated one of said plurality of pieces of image processing information in response to a command entry based on a result of said simulation, wherein the classification of said pieces of RGB image data by said image classification element in accordance with the result of said comparison between said at least one image feature value and said predetermined classification criterion includes at least one of printing-suitability-based categorization and image-representation-based categorization, said printing-suitability-based categorization being carried out from the viewpoint of whether or not an image of sufficient quality is printed by the execution of only color space conversion from RGB to CMYK and standard correction process, and image-representation-based categorization being carried out according to what said each of said pieces of RGB image data represents, and said association processing element associates the same piece of image processing information with some of said plurality of pieces of RGB image data which are classified into the same image category.

2. An image processing information association processor for performing an association process, said association process being the process of associating image processing information necessary for a predetermined output device to perform predetermined image processing with each of a plurality of pieces of RGB image data contained in layout data described by descriptions in a page description language, said image processing information association processor comprising:

a) an image processing information storage element for storing therein a plurality of pieces of image processing information different in detail of processing from each other;

b) a layout data reading element for reading layout data containing pieces of RGB image data;

c) an image data extraction element for extracting said pieces of RGB image data from said layout data by searching the descriptions with respect to said pieces of RGB image data in said layout data;

d) an image feature value calculation element for calculating at least one image feature value for each of said pieces of RGB image data extracted;

e) an image classification element for making a comparison between said at least one image feature value and a predetermined classification criterion to classify said pieces of RGB image data into a plurality of image categories in accordance with a result of the comparison, said plurality of image categories being previously determined in accordance with said classification criterion;

f) an association processing element for associating a selected one of said plurality of pieces of image processing information with each of said pieces of RGB image data;

g) a combination element for combining the associated one of said plurality of pieces of image processing information with said layout data;

h) a simulation processing element simulating said predetermined image processing to be performed by said predetermined output device on said pieces of RGB image data, based on said associated one of said plurality of pieces of image processing information; and i) a fine adjustment element for making a fine adjustment to said associated one of said plurality of pieces of image processing information in response to a command entry based on a result of said simulation, wherein said predetermined image processing is the process of converting each of said pieces of RGB image data into a piece of image data capable of being subjected to an output process in said predetermined output device, and wherein said output process is performed based on layout data containing said pieces of RGB image data subjected to said predetermined image processing, wherein the classification of said pieces of RGB image data by said image classification element in accordance with the result of said comparison between said at least one image feature value and said predetermined classification criterion includes at least one of printing-suitability-based categorization and image-representation-based categorization, said printing-suitability-based categorization being carried out from the viewpoint of whether or not an image of sufficient quality is printed by the execution of only color space conversion from RGB to CMYK and standard correction process, and image-representation-based categorization being carried out according to what said each of said pieces of RGB image data represents, and said association processing element associates the same piece of image processing information with some of said plurality of pieces of RGB image data which are classified into the same image category.

3. The image processing information association processor according to claim 2, wherein said predetermined image processing includes a color space conversion process and an image correction process.

4. The image processing information association processor according to claim 2, wherein said image feature value calculation element includes a sharp peak counting element for counting the number of sharp peaks indicative of the number of peaks sharper than a predetermined limit which appear in a gradation level histogram for each color component of an RGB image represented by each of said one or more pieces of RGB image data.

5. The image processing information association processor according to claim 2, wherein said image feature value calculation element includes an edge component value calculation element for calculating an edge component value indicative of the proportion of existing edges to the entire image for each color component of an RGB image represented by each of said one or more pieces of RGB image data.

6. The image processing information association processor according to claim 2, wherein
said image feature value calculation element includes
a high saturation pixel ratio calculation element for calculating a high saturation pixel ratio indicative of the proportion of pixels having a saturation higher than a predetermined threshold value in an RGB image represented by each of said one or more pieces of RGB image data.

7. The image processing information association processor according to claim 2, wherein
said image feature value calculation element includes
a specific color pixel ratio calculation element for calculating a specific color pixel ratio indicative of the proportion of pixels having gradation levels falling within a predetermined range in an RGB image represented by each of said one or more pieces of RGB image data.

8. The image processing information association processor according to claim 2, wherein
said image feature value calculation element includes
an image line segment value calculation element for calculating an image line segment value indicative of the amount of line segments appearing in an RGB image represented by each of said one or more pieces of RGB image data.

9. A method of enabling a predetermined output device to perform an output process based on layout data described by descriptions in a page description language containing a plurality of pieces of RGB image data, said method comprising the steps of:
a) extracting said pieces of RGB image data from said layout data by searching the descriptions with respect to said pieces of RGB image data in said layout data;
b) calculating at least one image feature value for each of said pieces of RGB image data extracted;
c) making a comparison between said at least one image feature value and a predetermined classification criterion to classify said pieces of RGB image data into a plurality of image categories in accordance with a result of the comparison, said plurality of image categories being previously determined in accordance with said classification criterion;
d) associating a selected one of a plurality of pieces of image processing information with each of said pieces of RGB image data, said plurality of pieces of image processing information being information necessary for said predetermined output device to perform predetermined image processing, said plurality of pieces of image processing information being different in detail of processing from each other and stored in a predetermined image processing information storage element;
e) combining the associated one of said plurality of pieces of image processing information with said layout data;
f) storing layout data resulting from said combination in said step e) so as to be sendable to said output device;
g) simulating image processing to be performed by said predetermined output device on said pieces of RGB image data, based on said associated one of said plurality of pieces of image processing information; and
h) making a fine adjustment to said associated one of said plurality of pieces of image processing information in response to a command entry based on a result of said simulation,
wherein the classification of said pieces of RGB image data in said step c) in accordance with the result of said comparison between said at least one image feature value and said predetermined classification criterion includes at least one of printing-suitability-based categorization and image-representation-based categorization, said printing-suitability-based categorization being carried out from the viewpoint of whether or not an image of sufficient quality is printed by the execution of only color space conversion from RGB to CMYK and standard correction process, and image-representation-based categorization being carried out according to what said each of said pieces of RGB image data represents, and
wherein said step associates the same piece of image processing information with some of said plurality of pieces of RGB image data which are classified into the same image category,
wherein said predetermined image processing is the process of converting each of said pieces of RGB image data into a piece of image data capable of being subjected to an output process in said output device, and
wherein said output process is performed based on layout data containing said pieces of RGB image data subjected to said predetermined image processing.

10. The method according to claim 9, wherein said predetermined image processing includes a color space conversion process and an image correction process.

11. The method according to claim 9, wherein
said step b) includes the step of
counting the number of sharp peaks indicative of the number of peaks sharper than a predetermined limit which appear in a gradation level histogram for each color component of an RGB image represented by each of said one or more pieces of RGB image data.

12. The method according to claim 9, wherein said step b) includes the step of calculating an edge component value indicative of the proportion of existing edges to the entire image for each color component of an RGB image represented by each of said one or more pieces of RGB image data.

13. The method according to claim 9, wherein
said step b) includes the step of
calculating a high saturation pixel ratio indicative of the proportion of pixels having a saturation higher than a predetermined threshold value in an RGB image represented by each of said one or more pieces of RGB image data.

14. The method according to claim 9, wherein
said step b) includes the step of
calculating a specific color pixel ratio indicative of the proportion of pixels having gradation levels falling within a specific range in an RGB image represented by each of said one or more pieces of RGB image data.

15. The method according to claim 9, wherein
said step b) includes the step of
calculating an image line segment value indicative of the amount of line segments appearing in an RGB image represented by each of said one or more pieces of RGB image data.

16. A non-transitory computer-readable storage medium including a program which, when executed by a computer, causes said computer to function as an image processing information association processor for performing an association process, said association process being the process of associating image processing information necessary for a predetermined output device to perform predetermined image processing with each of a plurality of pieces of RGB image data contained in layout data described by descriptions in a page description language, said image processing information association processor comprising:

a) an image processing information storage element for storing therein a plurality of pieces of image processing information different in detail of processing from each other;
b) a layout data reading element for reading layout data containing pieces of RGB image data;
c) an image data extraction element for extracting said pieces of RGB image data from said layout data by searching the descriptions with respect to said pieces of RGB image data in said layout data;
d) an image feature value calculation element for calculating at least one image feature value for each of said pieces of RGB image data extracted;
e) an image classification element for making a comparison between said at least one image feature value and a predetermined classification criterion to classify said pieces of RGB image data into a plurality of image categories in accordance with a result of the comparison, said plurality of image categories being previously determined in accordance with said classification criterion;
f) an association processing element for associating a selected one of said plurality of pieces of image processing information with each of said pieces of RGB image data;
g) a combination element for combining the associated one of said plurality of pieces of image processing information with said layout data;
h) a simulation processing element simulating said predetermined image processing to be performed by said predetermined output device on said pieces of RGB image data, based on said associated one of said plurality of pieces of image processing information; and
i) a fine adjustment element for making a fine adjustment to said associated one of said plurality of pieces of image processing information in response to a command entry based on a result of said simulation,
wherein said association processing element associates the same piece of image processing information with some of said plurality of pieces of RGB image data which are classified into the same image category,
wherein said predetermined image processing is the process of converting each of said pieces of RGB image data into a piece of image data capable of being subjected to an output process in said predetermined output device,
the classification of said pieces of RGB image data by said image classification element in accordance with the result of said comparison between said at least one image feature value and said predetermined classification criterion includes at least one of printing-suitability-based categorization and image-representation-based categorization, said printing-suitability-based categorization being carried out from the viewpoint of whether or not an image of sufficient quality is printed by the execution of only color space conversion from RGB to CMYK and standard correction process, and image-representation-based categorization being carried out according to what said each of said pieces of RGB image data represents, and
wherein said output process is performed based on layout data containing said pieces of RGB image data subjected to said predetermined image processing.

* * * * *